United States Patent
Kang et al.

(10) Patent No.: US 11,362,422 B2
(45) Date of Patent: Jun. 14, 2022

(54) DEVICE AND METHOD FOR INTRA-SHIP COMMUNICATION

(71) Applicants: ZN TECHNOLOGIES CO., LTD., Ulsan (KR); UNIST(ULSAN NATIONAL INSTITUTE OF SCIENCE AND TECHNOLOGY), Ulsan (KR); ZN OCEAN CO., LTD., Busan (KR)

(72) Inventors: Chang Soo Kang, Gyeonggi-do (KR); Na Young Kim, Seoul (KR); Eun Gyu Bae, Gyeonggi-do (KR); Mi Young Kim, Gyeonggi-do (KR); Chul Gyun Park, Seoul (KR); Franklin Don Bien, Ulsan (KR)

(73) Assignees: ZN TECHNOLOGIES CO., LTD., Ulsan (KR); UNIST(ULSAN NATIONAL INSTITUTE OF SCIENCE AND TECHNOLOGY), Ulsan (KR); ZN OCEAN CO., LTD., Busan (KR)

( * ) Notice: Subject to any disclaimer, the term of this patent is extended or adjusted under 35 U.S.C. 154(b) by 357 days.

(21) Appl. No.: 16/631,446

(22) PCT Filed: Aug. 14, 2017

(86) PCT No.: PCT/KR2017/008843
§ 371 (c)(1),
(2) Date: May 7, 2020

(87) PCT Pub. No.: WO2019/017520
PCT Pub. Date: Jan. 24, 2019

(65) Prior Publication Data
US 2020/0303819 A1    Sep. 24, 2020

(30) Foreign Application Priority Data
Jul. 17, 2017    (KR) .......................... 10-2017-0090548

(51) Int. Cl.
*H01Q 1/34* (2006.01)
*H04B 5/00* (2006.01)
(Continued)

(52) U.S. Cl.
CPC .............. *H01Q 5/335* (2015.01); *H01Q 1/34* (2013.01); *H04B 5/0037* (2013.01); *H04M 1/18* (2013.01)

(58) Field of Classification Search
CPC ........... H01Q 5/335; H01Q 1/34; H01Q 1/04; H01Q 1/12; H01Q 1/28; H01Q 1/32;
(Continued)

(56) References Cited

U.S. PATENT DOCUMENTS 6,600,896 B2 * 7/2003 Chadwick ........ H04N 21/43615
455/99
9,423,495 B1 * 8/2016 Chang ................. G01S 13/0218
(Continued)

FOREIGN PATENT DOCUMENTS

| CN | 1656717 | 8/2005 |
| CN | 101072050 | 11/2007 |

(Continued)

OTHER PUBLICATIONS

Off-Hull Radio Frequency Emissions from Below-Deck Spaces in Ships—Gregory Tait et al. (Year: NA).*
(Continued)

*Primary Examiner* — Vibol Tan
(74) *Attorney, Agent, or Firm* — Hodgson Russ LLP (57) ABSTRACT

The present invention relates to an interphone device for use in ships, the interphone device comprising: an input/output unit to which a voice is input or from which a voice is output; a transmission/reception circuit unit which receives the voice from the input/output unit and provides a first signal obtained by encoding and modulating the received
(Continued)

voice; and an antenna which is attached to the metal hull of the ship, forms an electromagnetic field in the metal hull, and carries the first signal received from the transmission/reception circuit unit by the electromagnetic field, so as to propagate the first signal.

19 Claims, 9 Drawing Sheets (51) Int. Cl.
*H04M 1/18* (2006.01)
*H01Q 5/335* (2015.01)
(58) Field of Classification Search
CPC ...... H04B 5/0037; H04B 5/00; H04B 5/0075; H04B 1/082; H04B 5/0031; H04M 1/18; H04M 1/0291
See application file for complete search history.

(56) References Cited

U.S. PATENT DOCUMENTS

| | | | | |
|---|---|---|---|---|
| 10,284,353 B2* | 5/2019 | Shope | ...................... | H01Q 1/30 |
| 10,418,695 B2* | 9/2019 | Kim | ........................ | H01Q 21/30 |
| 10,468,914 B2* | 11/2019 | Lee | ......................... | H02J 50/20 |
| 10,622,727 B2* | 4/2020 | Kang | ...................... | H04N 7/183 |
| 2011/0254746 A1* | 10/2011 | Park | ......................... | H01Q 3/22 |
| | | | | 333/236 |
| 2014/0062215 A1* | 3/2014 | Seo | ......................... | H02J 50/12 |
| | | | | 307/104 |
| 2017/0136959 A1* | 5/2017 | Denny | ................... | B60R 11/04 |

FOREIGN PATENT DOCUMENTS

| | | |
|---|---|---|
| CN | 102598407 | 7/2012 |
| CN | 103089249 | 5/2013 |
| CN | 105931449 | 9/2016 |
| JP | 2005341178 | 12/2005 |
| JP | 2011176763 | 9/2011 |
| KR | 20020070704 | 9/2002 |
| KR | 20050008741 | 1/2005 |
| KR | 20130087708 | 8/2013 |
| KR | 20170033943 | 3/2017 |

OTHER PUBLICATIONS

Druganti et al., "Evanescent Mode Power-transfer and Communication Technology for Internet of Things Device Charging Over Metal Surfaces," The Institute of Electronics and Information Engineers, 2016, vol. 6, pp. 1633-1636.
WIPO, ISR for PCT/KR2017/008843, dated Apr. 23, 2018.

* cited by examiner

DEVICE AND METHOD FOR INTRA-SHIP COMMUNICATION

TECHNICAL FIELD

Example embodiments relate to a communication device and method, and more particularly, to a device that transmits and receives a signal, such as video or the like from one side of the ship to the other thereof.

BACKGROUND ART

In ships, interphone devices for communication are wiredly connected to each other. The power supply for the interphone installed in each compartment divided by a partition is also connected wiredly.

However, this wired connection makes the installation of an interphone difficult during both shipbuilding and post-production of a ship. Due to the wired connection, a hole needs to be drilled into the ship's partition; the length of the ship is hundreds of meters, and thus the wired connection for a long length is expensive.

For the purpose of replacing such the wired connection, a wireless connection such as a Radio Frequency (RF) method or the like may be possible, but may not be used in a space where electromagnetic waves are shielded by a steel partition.

DETAILED DESCRIPTION OF THE INVENTION

Technical Solutions

According to an example embodiment, there is provided an interphone device installed and used in a ship, the interphone device including an input/output unit to receive or output a voice, a transmission/reception circuit unit to receive the voice from the input/output unit, to encode and modulate the voice and to provide a first signal, an antenna attached to a metal hull of the ship and configured to form an electromagnetic field in the metal hull, to load the first signal received from the transmission/reception circuit unit into the electromagnetic field and to propagate the first signal, and a controller to feed back impedance of the antenna and to adjust the impedance of the antenna to match impedance of a receiver.

According to another example embodiment, the antenna may include a first layer formed of a conductive material and including at least one opening contacting the hull, a second layer formed of a conductive material and adjacent to the first layer, and a third layer formed of a dielectric material, interposed between the first layer and the second layer and configured to exchange electromagnetic waves with the hull to load the first signal into the electromagnetic field. Also, the first layer may include nine openings having an array of 3×3.

According to another example embodiment, the antenna unit may receive power from an electromagnetic wave transmitted through the hull and may provide the power to the transmission/reception circuit unit, and the transmission/reception circuit unit may supply power to the input/output unit through a converter. At least one of the first layer and the second layer may include a copper material.

According to another example embodiment, the third layer may include at least one material of carbon fiber, acrylic, and polycarbonate.

According to an aspect, there is provided an interphone device for receiving a voice from an input/output unit installed in a ship, the interphone device including an antenna attached to a first location of a metal hull of the ship and configured to receive a first signal corresponding to the voice when an antenna on a side of an input unit attached to a second location of the metal hull of the ship forms an electromagnetic field in the metal hull and loads the first signal onto the electromagnetic field to propagate the first signal, a transmission/reception circuit unit to modulate and decode the first signal and to provide the modulated and decoded result as the voice, and a controller to feed back impedance of the antenna and to adjust the impedance of the antenna to match impedance of a transmitter.

According to another aspect, the antenna may include a first layer formed of a conductive material and including at least one opening contacting the hull, a second layer formed of a conductive material and adjacent to the first layer, and a third layer formed of a dielectric material, interposed between the first layer and the second layer, and to receive the first signal by exchanging electromagnetic waves with the hull.

According to another aspect, at least one of the first layer and the second layer may include a copper material. The third layer may include at least one material of carbon fiber, acrylic, and polycarbonate.

According to another aspect, the transmission/reception circuit unit may transmit the power to the antenna, and the antenna may propagate the power to an antenna of a side of the interphone by forming an electromagnetic field in the metal hull, when supply power from a battery of the ship or power of the a ship is converted and transmitted to an antenna receiving the first signal.

According to another example embodiment, there is provided a repeater installed and used in a ship, the repeater including an input/output unit to receive or output data, a transmission/reception circuit unit to receive the data from the input/output unit, to encode and modulate the data and to provide a first signal, an antenna attached to a metal hull of the ship and configured to form an electromagnetic field in the metal hull, to load the first signal received from the transmission/reception circuit unit into the electromagnetic field and to propagate the first signal, and a controller to feed back impedance of the antenna and to adjust the impedance of the antenna to match impedance of a receiver.

According to an example embodiment, there is provided a power transmitting device installed and used in a ship, the power transmitting device including an antenna attached to a metal hull of the ship and configured to form an electromagnetic field in the metal hull, to load power into the electromagnetic field and to propagate the power, and a controller to feed back impedance of the antenna and to adjust the impedance of the antenna to match impedance of a receiver.

According to another example embodiment, there is provided a power receiving device installed and used in a ship, the power receiving device including an antenna attached to a first location of a metal hull of the ship and configured to receive power when an antenna on a side of a power transmitting device attached to a second location of the metal hull of the ship forms an electromagnetic field in the metal hull and loads the power onto the electromagnetic field to propagate the power, and a controller to feed back impedance of the antenna and to adjust the impedance of the antenna to match impedance of a transmitter.

BEST MODE FOR CARRYING OUT THE INVENTION

Hereinafter, example embodiments will be described in detail with reference to the accompanying drawings. However, the scope of the inventive concept is neither limited nor restricted by the example embodiments. The same reference numerals in the drawings denote the same members.

The terms used in the description below has been selected as be general and universal terms in the related art, but other terms are present depending on the development and/or change of technology, conventions, preferences of the technicians, and the like. Therefore, the terms used in the description below should not be understood as limiting the technical spirit, but should be understood as illustrative terms for describing the example embodiments.

Terms arbitrarily selected by the applicant of the example embodiments may also be used in a specific case. In this case, the detailed meanings are given in the corresponding description. Accordingly, the terms used in the description below should be understood based on the meaning of the term and the contents throughout the specification, not by simply stating the terms.

Configuration of Ship Interphone Device

A ship interphone device according to example embodiments includes an input/output unit (or a handset is also possible) that inputs or outputs a voice, a transmission/reception circuit unit that processes the voice, and an antenna that transmits and receives a signal in the communication method suggested below. Conventionally, the process of transmitting voice data or electrical signal is performed by wired communication or wireless communication of an RF scheme. However, according to example embodiments, voice data or electrical signals are transmitted from one side to the other side by metal body communication (or magnetic field communication), which uses the hull of the ship as the medium of communication. Furthermore, the transmitter of one side transmits the supply power to the receiver of the other side, thereby delivering the operating power of the ship interphone device.

The ship interphone device according to an example embodiment may be applied to the remote emergency call for a ship. However, this is just one of exemplary applications and other types of products are possible. The application may be also applied to various communications such as a video call, a text message, or the like as well as an interphone performing voice communication.

The ship interphone device according to an example embodiment includes an input/output unit that inputs or outputs a voice and a transmission/reception circuit unit that encodes and modulates the voice to provide a first signal (it means an electrical and/or magnetic signal, the same as above). Furthermore, the device includes an antenna that is attached to the ship's metal hull, forms an electromagnetic field in the metal hull, and loads the first signal received from the transmission/reception circuit unit into the electromagnetic field, so as to propagate the first signal. The configuration of the antenna unit will be described later in more detail with reference to FIGS. 3 to 4.

According to an example embodiment, the interphone device receives and processes the signal that is transmitted by the input/output unit through the hull using metal body communication. The interphone device includes an antenna attached to the first location of the ship's metal hull. When an antenna on the side of the interphone device attached to the second location of the ship's metal hull forms an electromagnetic field in the metal hull and propagates the first signal corresponding to the voice in the electromagnetic field, this antenna receives the first signal. The interphone device also includes a transmission/reception circuit unit that modulates and decodes the first signal and provides the modulated and decoded result as the voice.

Figure 1:
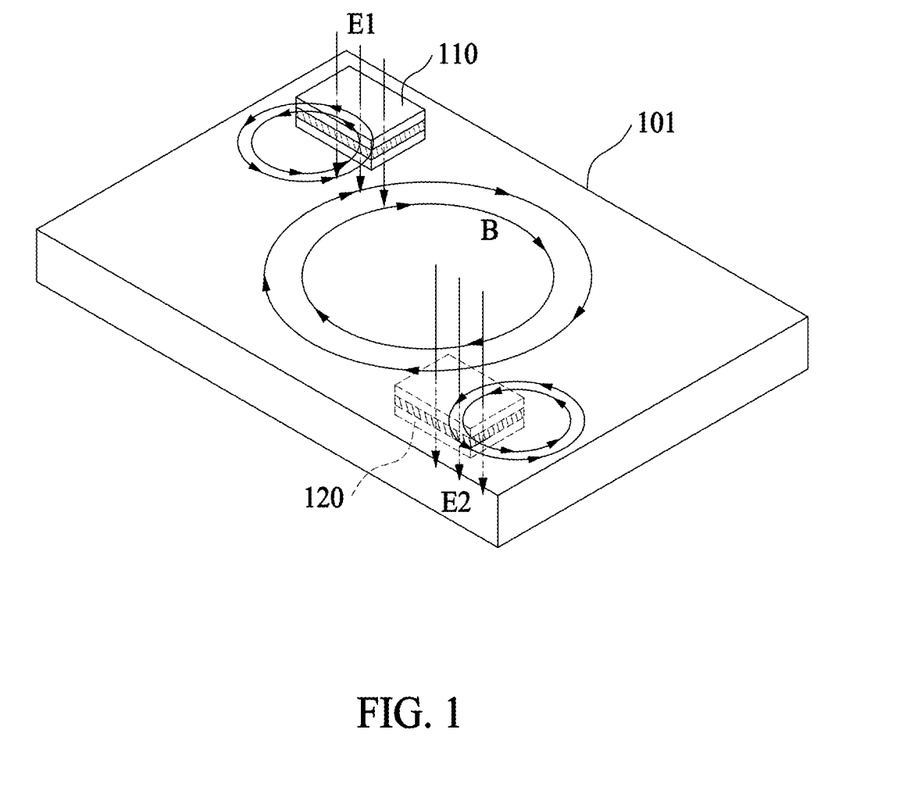
FIG. 1 is a schematic diagram for describing a principle that an image is transmitted through a metal hull, according to an example embodiment.

Then, the principle that the voice is capable of being transmitted through the metal hull will be described first with reference to FIG. 1. FIG. 1 is a schematic diagram for describing a principle that a voice is transmitted through a metal hull, according to an example embodiment. In the illustrated example, for example, a metal medium 101 may be the steel sheet or frame structure of the hull. It is separately described that the case where the metal medium 101 is a magnetic substance and the case where the metal medium 101 is a diamagnetic substance.

Case where Metal Medium is Magnetic Substance

The conductive layers of a first antenna 110 form an electromagnetic field in the dielectric layer. Then, the electromagnetic field where a magnetic field is dominant is formed in the metal medium 101, which is radio media, by an electromagnetic field. Among the generated electromagnetic fields, an electric field E1 perpendicularly propagates to the metal medium 101 through the aperture of the antenna 110. The propagated electric field E1 forms an electromagnetic field B where a magnetic field is dominant in the metal medium 101.

Then, according to a similar structure and principle by the reversibility theory, a second antenna 120 on the receiver side receives energy from the electromagnetic field formed in the metal medium 101. In this process, the change in the electromagnetic field B, in which a magnetic field is dominant, is transmitted to the electromagnetic field E2, in which an electric field is dominant, through the aperture of the antenna 120 in the dielectric layer.

Because the magnetic field is dominant in this metal body communication, the impedance change is small even though the shape and size of the metal medium 101 change. Furthermore, because the metal medium 101 has a higher permeability than air, the metal medium 101 has radio propagation efficiency better than a communication system using the propagation into the air.

For example, steel has a permeability of about 2000 and pure iron has a permeability of about 4000 to 5000; this means that the steel and the pure iron have permeability about 2000 times and about 4000 to 5000 times greater than the permeability of air, respectively. This means that the propagation of the magnetic field in the magnetic substance is much stronger than in the air and is farther than the propagation into the air. Accordingly, it means that the distance of communication through the metal medium 101, which is a magnetic substance, is farther than magnetic field communication in the air. For the purpose of forming an electromagnetic field, in which the magnetic field is dominant, the resonator and the circuit unit needs to be designed such that the electric field of a certain magnitude is formed inside the metal body.

In the meantime, in the case of metal medium with high permeability, the propagation efficiency is increased and the transmission distance varies depending on the wavelength of the operating frequency. Due to the electromagnetic field formed in the metal medium 101, energy may be delivered to a resonator at a specific distance from the metal medium. Because the magnetic field in the electromagnetic field formed in the metal medium 101 is dominant, the electric field is emitted from the metal medium 101; accordingly, energy reception is possible when the antenna resonating at the operating frequency is within a specific distance from the metal medium 101.

The dielectric substance of the dielectric layer of antenna 110 or 120 may reduce the thickness and size of the resonator and may allow sufficient energy to be transferred by forming the electromagnetic field B in which the magnetic field is dominant, in the metal medium 101.

Case where Metal Medium is Paramagnetic Substance or Diamagnetic Substance

The current fed to the side of the conductive layer forms the electromagnetic field E1, in which the electric field is dominant, in the metal medium 101. At this time, the electric field radiated from the aperture does not form an electromagnetic field B, in which the magnetic field is dominant, in the metal medium 101. The reason is that paramagnetic and diamagnetic substances have similar permeability to air. Accordingly, as in the case of the ferromagnetic substance, in the metal medium 101 of the paramagnetic or diamagnetic substances, the propagation of the magnetic field in the air is not stronger and the magnetic field propagates in a similar magnitude. In other words, the distance of the propagation in the air or inside the metal body is similar.

In the case of pure iron, which is a ferromagnetic substance, the permeability is between 4000 and 5000; aluminum, which is a paramagnetic substance, or silver, which is a diamagnetic substance, has a permeability of about 1.0; the intensity of the magnetic field propagation inside the metal body is different. Accordingly, in this case, the signal propagates to the receiver by the current induced from the layer in contact with the metal medium 101 of the conductive layer of the antenna to the metal medium 101. At this time, the electric field radiated from the aperture is induced in the metal body, and thus the signal or power is transmitted.

Structure of Antenna Part

Figure 2:
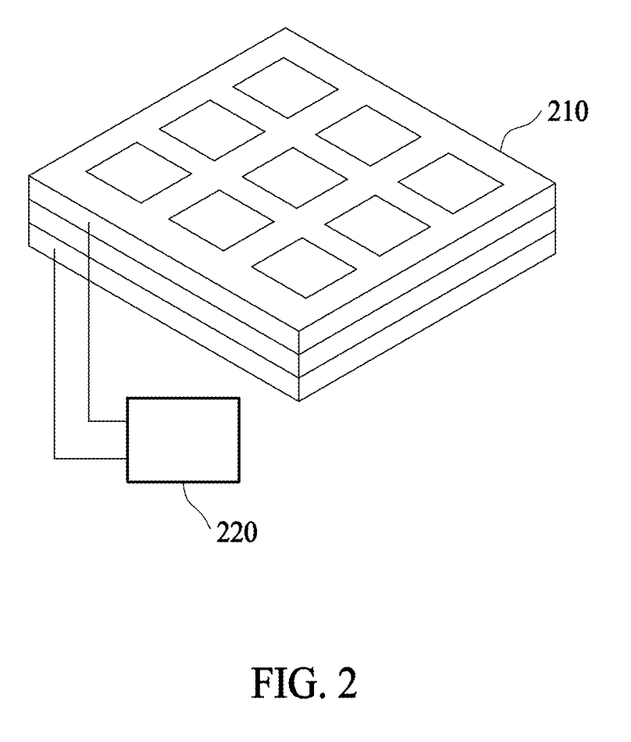
FIG. 2 illustrates an antenna unit and a transmission/reception circuit unit, according to an example embodiment.

FIG. 2 illustrates an antenna unit 210 and a transmission/reception circuit unit 220, according to an example embodiment. In the illustrated example, the antenna 210 includes an aperture and includes a first layer of a conductive material that will contact the metal medium, a second layer of a conductive material disposed on the opposite surface of the first layer, and a third layer of a dielectric material included between the first layer and the second layer.

Figure 3:
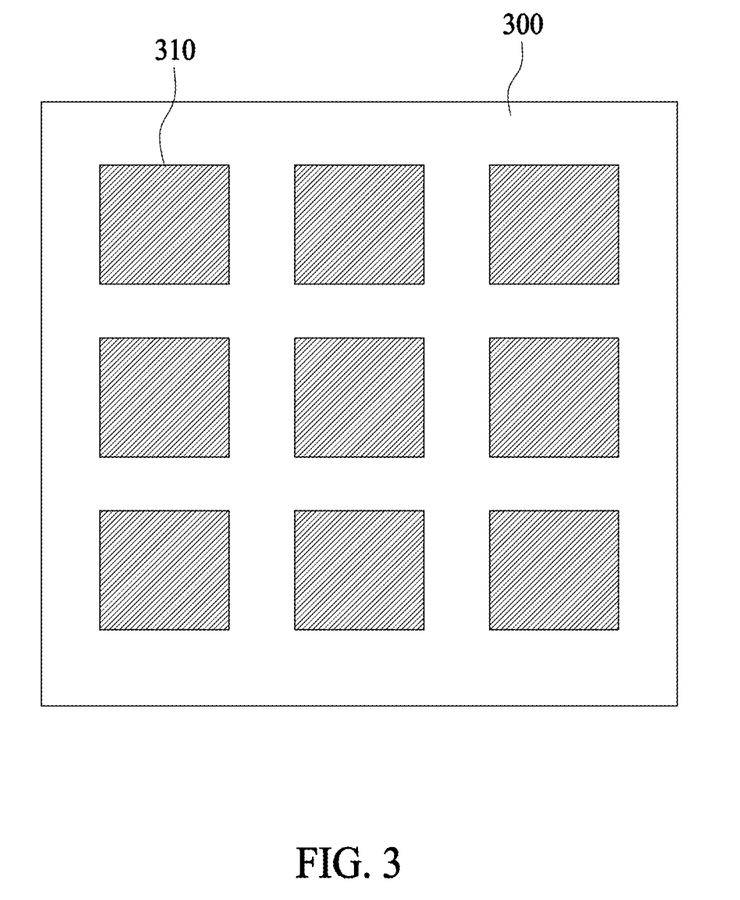
FIG. 3 is a plan view of an antenna unit, according to an example embodiment.

FIG. 3 is also referenced. FIG. 3 is a plan view of an antenna unit 300, according to an example embodiment. By way of example, but not limitation, the first layer and/or second layer may include nine openings 310 having the array of 3×3. However, the number of apertures may be determined differently depending on the application and the communication environment. Alternatively, the first layer and the second layer may have one or a plurality of apertures, but may not have an aperture in some cases. The shape of the aperture may be circular or polygonal, and the size of the aperture is determined such that sufficient energy is delivered by forming an electromagnetic field, in which the magnetic field is dominant, in the metal medium.

The thickness of each layer is determined such that sufficient energy is transmitted by forming an electromagnetic field, in which the magnetic field is dominant, in the metal medium in consideration of a wavelength and a skin depth. Other layer(s) with different electrical characteristics may be added to the first or second layer, in the opposite direction of the third layer. For example, the formation of a strong electromagnetic field may be induced by adding another dielectric layer to the upper layer of the first layer. For another example, an electrical connection to the metal medium may be prevented by adding an insulator to the upper layer of the first layer.

Figure 4:
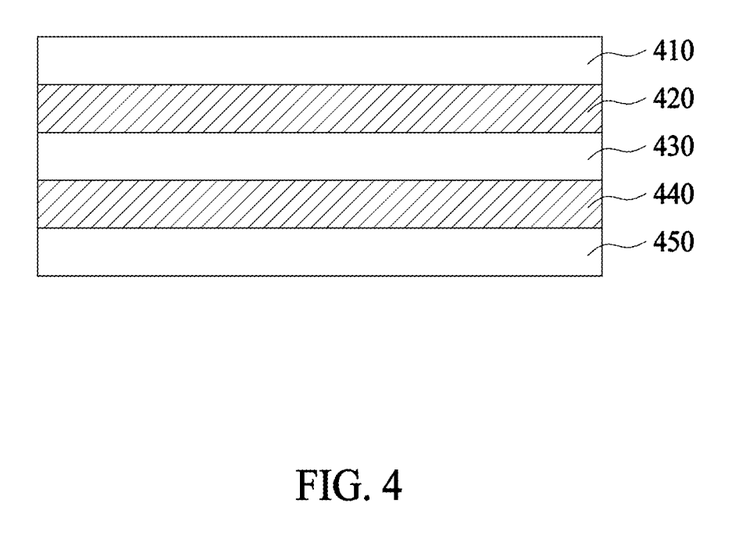
FIG. 4 is a side view of an antenna unit, according to an example embodiment.

The third layer, which is an intermediate layer between the first and second layers, may be implemented with a dielectric substance or insulator. By way of example, but not limitation, the third layer may include at least one of carbon fiber, acrylic, and polycarbonate. However, other materials such as paint (varnish), polymer resin film, and the like may be included. Furthermore, the third layer may include multiple layers with different properties, a plurality of dielectrics, or an insulator. An exemplary antenna configuration having two or more dielectric layers is illustrated in FIG. 4. FIG. 4 is a side view of an antenna unit, according to another example embodiment. In the illustrated example embodiment, dielectric layers 420 and 440 are interposed between conductive layers 410, 430, and 450 such as copper. The number of dielectric layers, the thickness thereof, and the like are the items of a design to be changed depending on the application or communication environment; the specific specification is determined such that energy enough to form the electromagnetic field, in which the magnetic field is dominant, is transferred to the metal medium.

In the above, the waveguide antenna is basically described as an example. However, other antenna types are possible when a resonator with a structure that forms an electromagnetic field, in which a magnetic field is dominant, in the metal body is designed. For example, a patch antenna or a horn antenna may be used.

Example of Additional Magnetic Field Induction

In the meantime, strong magnetic fields may be induced in the metal body by attaching ferromagnetic substances to the metal medium 101 in advance. For example, a dielectric substance or an insulator is attached on the first layer and then the ferromagnetic substance is attached on the dielectric substance or the insulator. Moreover, it is placed on a metal medium.

Then, the attached ferromagnetic substance forms a strong magnetic field; this causes the magnetic field to be induced in the metal medium, thereby forming a magnetic field stronger than directly inducing the magnetic field in the metal body. When the attached ferromagnetic substance is the refined iron or mu-metal having the permeability of 100,000 to 200,000, a much stronger magnetic field may be formed in the metal body. In another example embodiment, it is also possible to wind the coil around the ferromagnetic substance and to attach it to the metal body while a magnetic field is generated in the ferromagnetic substance.

Transmission/Reception Circuit Unit

FIG. 2 is also referenced. The transmission/reception circuit unit 220 is a circuit device that converts the signal, which is transmitted and received by the antenna 210 being a resonator, into a meaningful signal. It is divided into a circuit for transmission and a circuit for reception. A transmission circuit unit may include a power supply circuit for driving a circuit or for supplying sufficient power to the resonator; may include a battery to this end. The transmission circuit is similar to the structure of a transmission system of a general wireless communication. However, an additional circuit is required for the resonator to emit sufficient power in some cases. For example, there is a need for a power amp., an automatic gain controller (AGC), or the like. The receiver has a structure similar to that of a general wireless communication system.

Use Frequency

The frequency used for communication is not particularly limited, but it is possible to select the optimal frequency depending on the characteristics of the transmitted data and the communication environment. The relationship of an antenna size (one side length of the antenna unit 300 in the example of FIG. 3) for some frequencies is illustrated in the table below.

TABLE 1

|  | 150 mm | 100 mm | 60 mm |
|---|---|---|---|
| Frequency f (Hz) | 25000000 | 25000000 | 25000000 |
| Speed of light C (m/s) | 300000000 | 300000000 | 300000000 |
| Wavelength λ (m) | 12 | 12 | 12 |
| Intra-wavelength λg (m) | 7.236 | 7.500 | 7.500 |
| Aperture (λgmm) | 4.146 | 2.667 | 1.600 |
| Side gap (λgmm) | 1.382 | 0.933 | 0.800 |
| Intermediate gap (λgmm) | 2.764 | 1.733 | 0.800 |
| Copper T (λgmm) | 0.041 | 0.040 | 0.040 |
| Dielectric T (λgmm) | 0.138 | 0.133 | 0.267 |

Operating Power

Although it was not video communication, the transmission and reception power in the 27 MHz band for voice communication (radio) is tested. The environment of the corresponding test is as follows.

Standby power: 1.794 W (regardless of an antenna size)

Transmission Power

Antenna size 150mm×150 mm: 22.08 W
Antenna size 100mm×100 mm: 21.39 W
Antenna size 60 mm×60mm: 10.35 W Reception Power Antenna size 150mm×150 mm: 2.76 W
Antenna size 100mm×100 mm: 3.45 W
Antenna size 60 mm×60 mm: 6.21 W In this test, the regulated voltage measured by a tester through a radio circuit was 13.8 V, the distance between a transmission antenna and a reception antenna was about 1 meter.

In this case, the measured current is as follows.

TABLE 2

| Antenna size | State | Tx | Rx |
|---|---|---|---|
| 60 mm × 60 mm | Standby | 0.13 (A) | 0.13 (A) |
|  | Acting | 0.75 (A) | 0.45 (A) |
| 100 mm × 100 mm | Standby | 0.13 (A) | 0.13 (A) |
|  | Acting | 1.55 (A) | 0.25 (A) |
| 150 mm × 150 mm | Standby | 0.13 (A) | 0.13 (A) |
|  | Acting | 1.60 (A) | 0.20 (A) |

The measured current varies depending on a voice signal level, and the measured current value is the average value.

Transmission of Power

Meanwhile, according to an example embodiment, power transmission and reception are also possible in addition to data communication. Because it transmits power similarly to transmitting a signal, it is also called a power transmitter or a power receiver. The power transmitter circuit unit of the power transmitter converts DC from the power outlet into an analog or RF signal, and transmits the converted power through a power transmitter resonator (same as antenna in signal transmission, the same as above).

The power receiver circuit unit (the same as antenna in signal reception, the same as above) of the power receiver receives the analog or RF signal, which is radiated through the power transmitter resonator of the power transmitter, through a power receiver resonator of the power receiver and converts the received analog or RF signal to DC in a power receiver circuit to supply the converted result to the necessary circuit. If necessary, the additionally required voltage may be converted (DC-DC converter) and then may be supplied. Moreover, when a battery is present in the power receiver, it is also possible to charge the battery and it is also possible to supply power to the required circuit at the same time while the battery is charged.

Example of Interphone System for Ship

Figure 5:
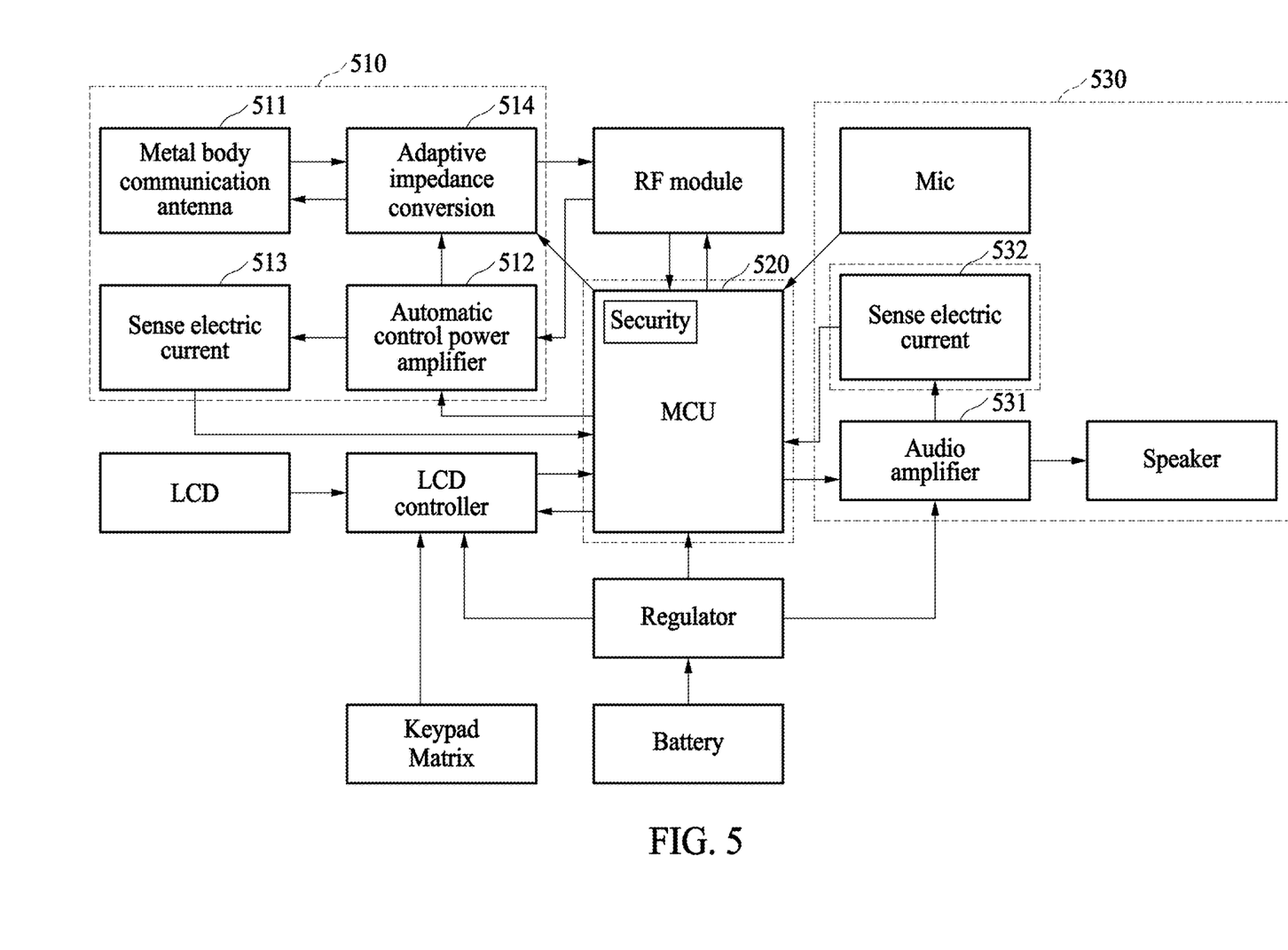
FIG. 5 is an exemplary block diagram of an overall system configuration, according to an example embodiment.

FIG. 5 is an exemplary block diagram of an overall system configuration, according to an example embodiment. According to an example embodiment, an interphone system for a ship may be roughly composed of an impedance matching unit 510, a Micro Controller Unit (MCU) 520, and an input/output unit 530.

The impedance matching unit 510 may be composed of a metal body communication antenna 511, an automatic control power amplifier 512, and a current sensing unit 513; the current sensing unit 513 performs current sensing (513) for impedance conversion (514). The input/output unit 530 may be composed of an audio amplifier 531, a current sensing unit 532, a speaker, and a microphone.

In more detail, the current sensing unit 532 senses the current of the audio amplifier 531 and delivers the current value to the MCU 520. The MCU 520 adaptively converts (514) the impedance of the metal body communication antenna 511 based on the sensed current. Moreover, the current sensing unit 513 continuously senses the amount of change in current flowing through the automatic control hull and then feeds the amount of change back to the MCU 520. As the amount of change is fed back, the MCU 520 adjusts the gain of the automatic control power amplifier 512 and then adaptively converts (514) the impedance of the metal body communication antenna 511.

For example, when the current of the audio amplifier 531 is constant but the current flowing into the hull changes, the impedance is converted (514) adaptively such that the impedances of the transmitter and receiver correspond to each other. The current sensing unit 513 is to detect changes of various impedances according to the distance between partitions, the thickness, and the structural change of a ship. Through the method, the communication efficiency is improved by matching transmitter impedance with receiver impedance. The adaptive impedance conversion (514) method will be described in detail with reference to FIG. 6.

The MCU 520 may receive power in a battery. It may also be possible to receive power adjusted by a regulator before the power is received. The battery may be a battery existing inside the ship or a separate power source of the ship. The regulator may supply power to an LCD controller, an MCU, and an audio amplifier.

Example of Impedance Matching

Figure 6:
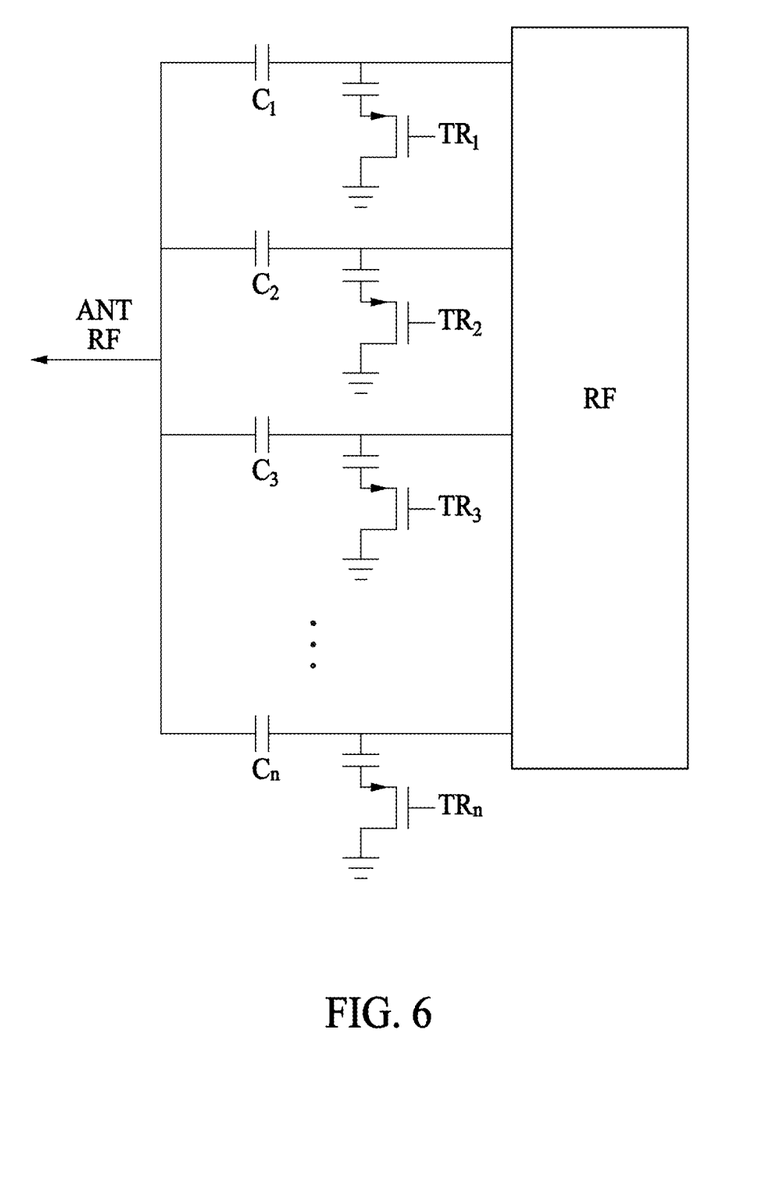
FIG. 6 is a simplified circuit diagram for impedance matching, according to an example embodiment.

FIG. 6 is a simplified circuit diagram for impedance matching, according to an example embodiment. An MCU uses a plurality of capacitors C1 to Cn and transistors TR1 to TRn for impedance matching. Hereinafter, for example, a capacitor and a transistor are used, but other electronic devices such as a diode and the like may be implemented to be used.

The plurality of capacitors are connected between an RF terminal and an antenna. In the plurality of transistors, a source is connected between each capacitor and an RF terminal, and a drain is connected to ground. Furthermore, the gate is connected to the MCU.

The plurality of transistors perform a switching role that is connected to the MCU and to control the on/off of a capacitor. The MCU allows the gate terminal voltages of the plurality of transistors to be adjusted.

First, the amount of change in the current flowing through the hull is measured. For example, when the amount of change is 10 mA, the voltage of an analog digital converter (ADC) is set to 5 mV. The transistor that turns on or off depending on a voltage level is selected. The impedance may be adjusted by turning the transistor on or off depending on the selection. Specific examples refer to Table 3 below.

TABLE 3

| ADC voltage | Selection | $TR_1$ | $TR_2$ | $TR_3$ | ... | $TR_n$ |
|---|---|---|---|---|---|---|
| 5 mV | Sel 1 | On | Off | Off | ... | Off |
| 10 mV | Sel 2 | Off | On | Off | ... | Off |
| 15 mV | Sel 3 | Off | Off | On | ... | Off |
| 20 mV | Sel 4 | On | On | Off | ... | Off |
| 25 mV | Sel 5 | Off | On | On | ... | Off |
| 30 mV | Sel 6 | Off | Off | On | ... | Off |
| ... | Sel n | On | On | On | ... | On |

Table 3 lists the number of cases in each of which a transistor is turned on and off depending on an ADC voltage in units of 5 mV. This is only an example and is not limited thereto; another method of matching impedances so as to correspond to each other may be possible. In impedance matching, the matching may be made using a lookup table as shown in Table 3; a method of calculating and matching the impedance depending on the current value every moment is also possible.

Appearance of Ship after Interphone is Installed

Figure 7:
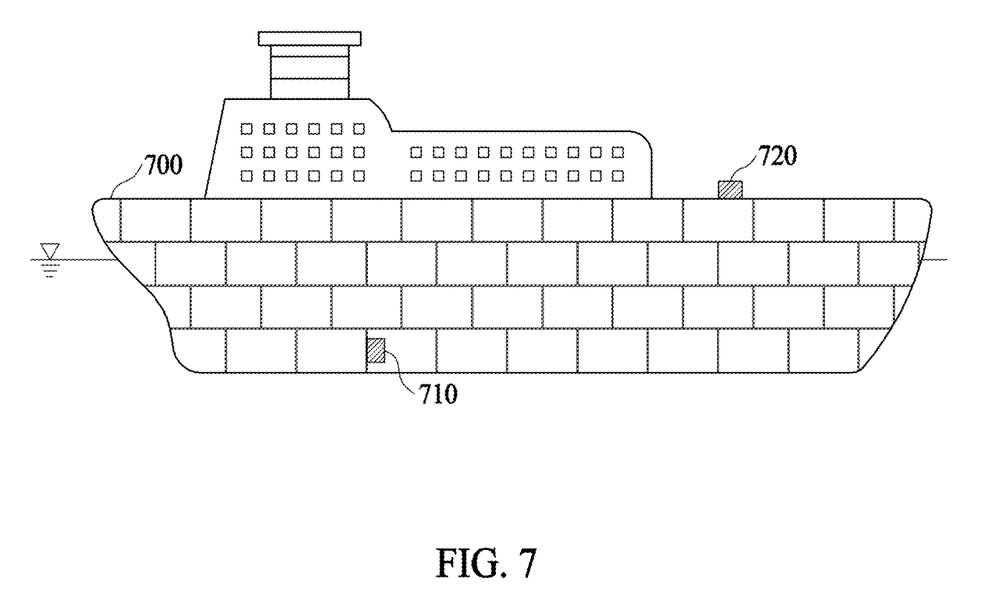
FIG. 7 is a view illustrating a whole ship in which a plurality of ship interphones are installed, according to an example embodiment.

FIG. 7 is a view illustrating a whole ship in which a plurality of ship interphones are installed, according to an example embodiment. FIG. 7 illustrates a ship 700 and ship interphones 710 and 720.

For example, when the first interphone 710 is present at the lowest point of the ship 700 and the second interphone 720 is present in an upper cabin, conventionally, each interphone needs to be connected wiredly. The conventional wireless communication is impossible because being blocked by the partition depending on the nature of a steel ship, and thus there is a need to wiredly connect the first interphone 710 to the second interphone 720 through drilling a hole in the steel partition. In the case of a large ship, the connection distance is hundreds of meters, and thus there is also a concern that the wired connection is expensive and is to be disconnected in the middle.

In case of using the proposed interphone, communication is possible as long as it is connected from the first interphone 710 to the second interphone 720 through metal. The communication method using a specific metal body is described in FIGS. 1 to 4. Accordingly, because it is connected from the first interphone 710 to the second interphone 720 through the steel partition, communication is possible without a separate wire connection.

In the example, each interphone is attached to a specific location but is not limited thereto. As long as the metal body is connected no matter where each interphone is attached to the ship 700, wireless communication is possible. Accordingly, while an interphone is carried instead of being fixed at a specific location, a shape that attaches and uses the interphone to a metal wall is also possible, if necessary.

Detail Appearance of Interphone

Figure 8:
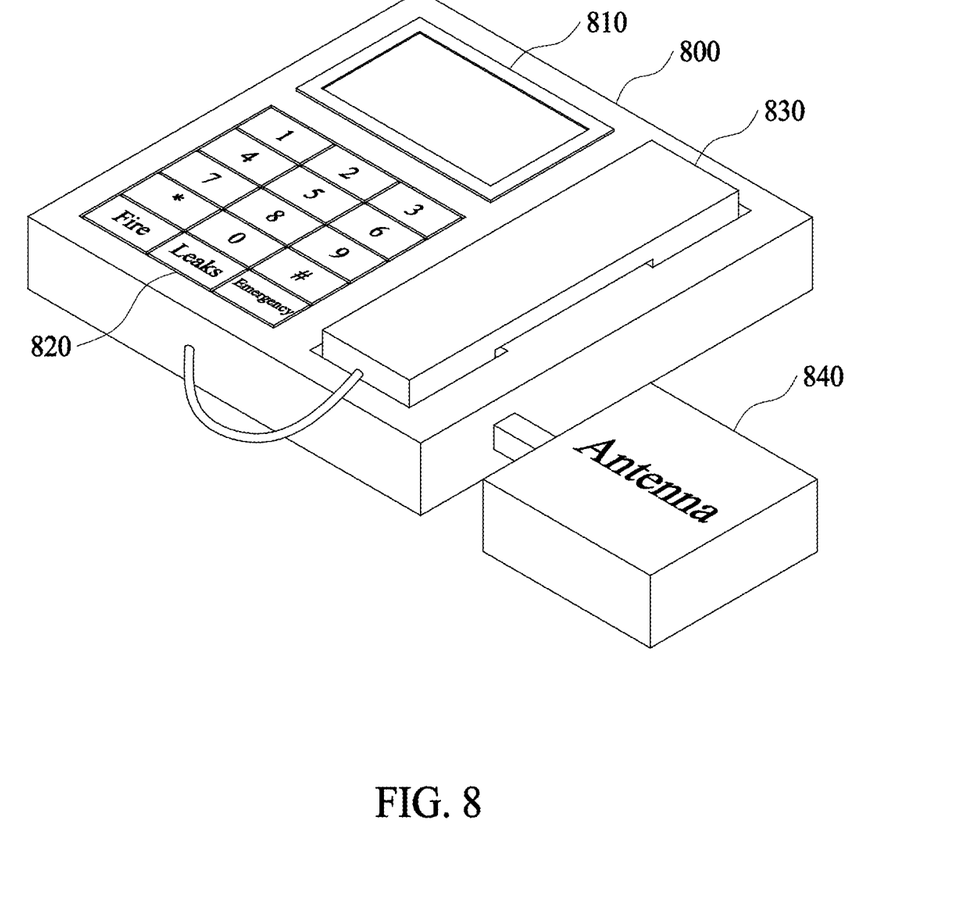
FIG. 8 illustrates a detailed appearance of a ship interphone, according to an example embodiment.

FIG. 8 illustrates a detailed appearance of a ship interphone, according to an example embodiment. The ship interphone 800 may be composed of an LCD display unit 810, a button unit 820, an input/output unit 830, and an antenna 840.

The LCD display unit 810 may display various pieces of information about caller information, current time, the location of an interphone, or the like and may display some information about a ship's status, without limiting the example.

The button unit 820 has a number pad for pressing a number when another interphone is connected and may additionally include a fire alarm button, a leak alarm button, an emergency notification button, and the like, as needed.

The input/output unit 830 includes an input unit (or a microphone) for the user to enter his/her voice and an output unit (or a speaker) for outputting the voice of a counterpart. The user may make a call to the counterpart, using the input/output unit. In some cases, a camera for making a video call may be further included.

Finally, the antenna 840 may be implemented in the form disclosed in FIG. 3. The antenna 840 is attached to one surface of the ship so as to communicate with an interphone attached to the other surface of the ship.

Appearance of Compartment in which Interphone is installed

Figure 9:
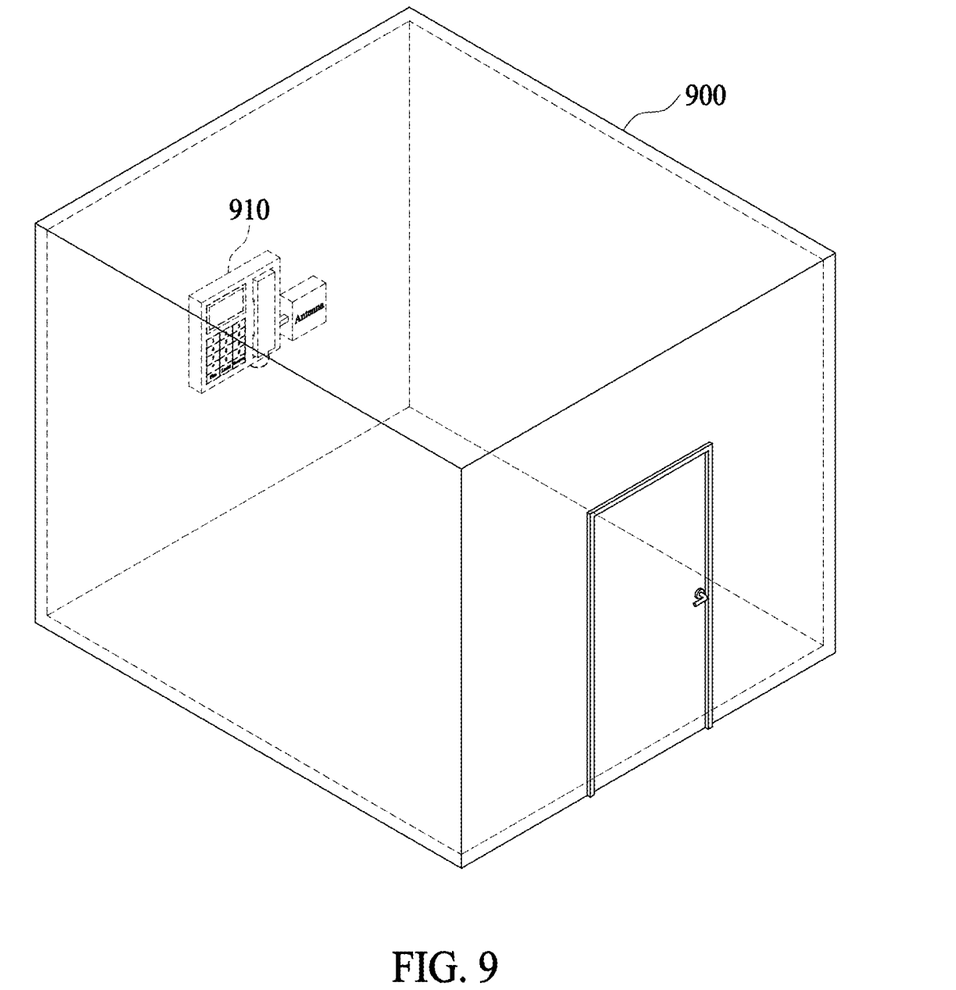
FIG. 9 illustrates an appearance in which a ship interphone is attached to a partition in a cabin, according to an example embodiment.

FIG. 9 illustrates an appearance in which a ship interphone is attached to a partition in a cabin, according to an example embodiment. The ship interphone 910 attached to any wall of a compartment 900 is illustrated.

As illustrated in FIG. 7, the compartment 900 refers to any room surrounded by metal walls present in a ship. The ship interphone 910 may be attached to any location inside the compartment.

Additional Example Embodiment

In the above examples, the interphone which transmits and receives a voice in the ship using the interphone is described, but is not limited thereto. A repeater that transmits and receives data is also possible.

In more detail, the repeater including a data input/output unit, a transmission/reception circuit unit, an antenna, and a controller is implemented. The repeater performs metal body wireless communication in the same scheme as the interphone, and the controller performs impedance matching. Even when data is transmitted and received, the communication efficiency or sensitivity may be improved through impedance matching.

There is also a specific example that is capable of performing transmission through the data communication. For example, a system for transmitting a photo or video file is also possible. When the interphone device installed and used in the ship additionally includes an image input/output unit, the interphone device may also transmit photo or video files. In detail, the camera may receive a photo or video and may output the photo or video through the display unit.

According to another example embodiment, even when wireless communication devices such as a laptop, a computer, a smartphone, and the like are used inside a specific compartment of the ship, the communication to the outside of the compartment is possible through the repeater. When the antenna of the proposed method is attached to the inside of a partition and the antenna outside a hull is connected to an external network, the communication to the outside is also possible.

The foregoing devices may be realized by hardware elements, software elements and/or combinations thereof. For example, the devices and components illustrated in the example embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may perform an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described example embodiments may be recorded in computer-readable media including program instructions to implement various operations embodied by a computer. The computer-readable medium may also include the program instructions, data files, data structures, or a combination thereof. The program instructions recorded in the media may be designed and configured specially for the example embodiments or be known and available to those skilled in computer software. The computer-readable medium may include hardware devices, which are specially configured to store and execute program instructions, such as magnetic media (e.g., a hard disk, a floppy disk, or a magnetic tape), optical recording media (e.g., CD-ROM and DVD), magneto-optical media (e.g., a floptical disk), read only memories (ROMs), random access memories (RAMs), and flash memories. Examples of program instructions include not only machine language codes created by a compiler, but also high-level language codes that are capable of being executed by a computer by using an interpreter or the like. The described hardware devices may be configured to act as one or more software modules to perform the operations of the above-described example embodiments of the inventive concept, or vice versa.

Even though example embodiments have been described with reference to limited drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other example embodiments, and equivalents to claims are within the scope of the following claims.

The invention claimed is:

1. An interphone device installed and used in a ship, the interphone device comprising:
   an input/output unit to receive or output a voice;
   a transmission/reception circuit unit to receive the voice from the input/output unit, to encode and modulate the voice, and to provide a first signal;
   an antenna attached to a metal hull of the ship and configured to form an electromagnetic field in the metal hull, to load the first signal received from the transmission/reception circuit unit into the electromagnetic field and to propagate the first signal; and
   a controller to feed back impedance of the antenna and to adjust the impedance of the antenna to match impedance of a receiver.

2. The interphone device of claim 1, wherein the antenna includes:
   a first layer formed of a conductive material and including at least one opening contacting the hull;
   a second layer formed of a conductive material and adjacent to the first layer; and
   a third layer formed of a dielectric material, interposed between the first layer and the second layer and configured to exchange electromagnetic waves with the hull to load the first signal into the electromagnetic field.

3. The interphone device of claim 2, wherein the first layer includes nine openings having an array of 3×3.

4. The interphone device of claim 1, wherein the antenna receives power from an electromagnetic wave transmitted through the hull and provides the power to the transmission/reception circuit unit, and the transmission/reception circuit unit supplies power to the input/output unit through a converter.

5. The interphone device of claim 2, wherein at least one of the first layer and the second layer includes a copper material.

6. The interphone device of claim 2, wherein the third layer includes at least one material of carbon fiber, acrylic, and polycarbonate.

7. The interphone device of claim 1, further comprising:
   a current sensing unit to sense current flowing into the hull, wherein the controller adjusts an impedance of the antenna depending on a current value sensed by the current sensing unit.

8. The interphone device of claim 7, wherein the controller adjusts an impedance of the antenna, using the sensed current value and a pre-calculated table.

9. An interphone device for receiving a voice from an input/output unit installed in a ship, the interphone device comprising:
   an antenna attached to a first location of a metal hull of the ship and configured to receive a first signal corresponding to the voice when an antenna on a side of an input unit attached to a second location of the metal hull of the ship forms an electromagnetic field in the metal hull and loads the first signal onto the electromagnetic field to propagate the first signal;
   a transmission/reception circuit unit to modulate and decode the first signal and to provide the modulated and decoded result as the voice; and
   a controller to feed back impedance of the antenna and to adjust the impedance of the antenna to match impedance of a transmitter.

10. The interphone device of claim 9, wherein the antenna includes:
    a first layer formed of a conductive material and including at least one opening contacting the hull;
    a second layer formed of a conductive material and adjacent to the first layer; and
    a third layer formed of a dielectric material, interposed between the first layer and the second layer, and configured to receive the first signal by exchanging electromagnetic waves with the hull.

11. The interphone device of claim 10, wherein at least one of the first layer and the second layer includes a copper material.

12. The interphone device of claim 10, wherein the third layer includes at least one material of carbon fiber, acrylic, and polycarbonate.

13. The interphone device of claim 9, wherein, when supply power from a battery of the ship or power of the a ship is converted and transmitted to an antenna receiving the first signal, the transmission/reception circuit unit transmits the power to the antenna, and the antenna propagates the power to an antenna of a side of the interphone by forming an electromagnetic field in the metal hull.

14. The interphone device of claim 9, further comprising:
    a current sensing unit to sense current flowing into the hull, and
    wherein the controller adjusts an impedance of the antenna depending on a current value sensed by the current sensing unit.

15. The interphone device of claim 9, wherein the controller adjusts an impedance of the antenna, using a sensed current value and a pre-calculated table.

16. A repeater installed and used in a ship, the repeater comprising:
    an input/output unit to receive or output data;
    a transmission/reception circuit unit to receive the data from the input/output unit, to encode and modulate the data, and to provide a signal;
    an antenna attached to a first location of a metal hull of the ship and configured to form an electromagnetic field in the metal hull, to load the signal received from the transmission/reception circuit unit into the electromagnetic field, and to propagate the signal; and
    a controller to feed back impedance of the antenna and to adjust the impedance of the antenna to match impedance of a receiver.

17. The repeater of claim 16, wherein the antenna is further configured to receive other signal corresponding to the data when an antenna on a side of an input unit attached to a second location of the metal hull of the ship forms an electromagnetic field in the metal hull and loads the other signal onto the electromagnetic field to propagate the other signal;
    the transmission/reception circuit unit is further configured to modulate and decode the other signal and to provide the modulated and decoded result as the data; and
    the controller is further configured to feed back impedance of the antenna and to adjust the impedance of the antenna to match impedance of a transmitter.

18. The interphone device of claim 1, wherein the antenna is further configured to load power into the electromagnetic field and to propagate the power.

19. The interphone device of claim 9, wherein the antenna is further configured to receive power when an antenna on a side of a power transmitting device attached to the second location of the metal hull of the ship forms an electromagnetic field in the metal hull and loads the power onto the electromagnetic field to propagate the power.

* * * * *